United States Patent
Carrillo et al.

(10) Patent No.: US 12,402,018 B2
(45) Date of Patent: Aug. 26, 2025

(54) ESTIMATING COMMUNICATION TRAFFIC DEMAND

(71) Applicant: Nokia Solutions and Networks Oy, Espoo (FI)

(72) Inventors: Maria Carrillo, Amadora (PT); Gil Santos, Lisbon (PT)

(73) Assignee: Nokia Solutions and Networks, Espoo (FI)

( * ) Notice: Subject to any disclaimer, the term of this patent is extended or adjusted under 35 U.S.C. 154(b) by 537 days.

(21) Appl. No.: 17/995,007

(22) PCT Filed: Apr. 1, 2021

(86) PCT No.: PCT/EP2021/058595
§ 371 (c)(1),
(2) Date: Sep. 29, 2022

(87) PCT Pub. No.: WO2021/204660
PCT Pub. Date: Oct. 14, 2021

(65) Prior Publication Data
US 2023/0217263 A1    Jul. 6, 2023

(30) Foreign Application Priority Data

Apr. 6, 2020 (FI) ..................... 20205360

(51) Int. Cl.
*H04W 16/22* (2009.01)
*H04W 16/18* (2009.01)

(52) U.S. Cl.
CPC ........... *H04W 16/18* (2013.01); *H04W 16/22* (2013.01)

(58) Field of Classification Search
CPC .............................. H04W 16/18; H04W 16/22
See application file for complete search history.

(56) References Cited

U.S. PATENT DOCUMENTS 8,364,155 B1    1/2013  Ahmed et al.
10,305,845 B1 *  5/2019  Waagen ............... H04L 67/306
(Continued)

FOREIGN PATENT DOCUMENTS

CN      106662628 A    5/2017
CN      110298687 A    10/2019
(Continued)

OTHER PUBLICATIONS

Office Action received for corresponding Japanese Patent Application No. 2022-561035, dated Nov. 14, 2023, 4 pages of office action and 3 pages of translation available.
(Continued)

*Primary Examiner* — Michael T Vu
(74) *Attorney, Agent, or Firm* — Nokia Technologies Oy

(57) ABSTRACT

This document discloses a solution for estimating network traffic capacity demand in an area of interest. According to an aspect, a computer-implemented method comprises: forming, by using one or more social media applications, a social media layer storing records of a plurality of places in the area of interest; forming, by using at least one source storing real geolocations of the places, a geolocation layer mapping the places to geolocations; classifying the places into a plurality of classes and assigning to each place a weight indicative of a traffic capacity demand dependent on a class of said place; building a capacity layer for the area of interest on the basis of the real geolocations of the places provided by the geolocation layer and the traffic capacity demand per place indicated by the weights, the capacity layer indicating spatial distribution of network traffic capacity demand in a plurality of sub-areas of the area of interest, the plurality of sub-areas comprising sub-areas having at least one of the places and sub-areas between the places.

25 Claims, 5 Drawing Sheets

(56) References Cited

U.S. PATENT DOCUMENTS

| | | | |
|---|---|---|---|
| 2005/0097161 A1 | 5/2005 | Chiou et al. | |
| 2009/0305709 A1 | 12/2009 | Panico et al. | |
| 2013/0073336 A1 | 3/2013 | Heath | |
| 2013/0086072 A1* | 4/2013 | Peng | G06F 16/9537 |
| | | | 707/754 |
| 2014/0358416 A1 | 12/2014 | Ibrahim | |
| 2015/0113024 A1 | 4/2015 | Howe | |
| 2017/0034659 A1 | 2/2017 | Shnitzer et al. | |
| 2017/0150365 A1 | 5/2017 | Goswami et al. | |
| 2018/0049039 A1 | 2/2018 | Chandrasekaran et al. | |
| 2018/0176859 A1 | 6/2018 | Haines et al. | |
| 2019/0379592 A1 | 12/2019 | Samadi | |
| 2020/0244511 A1* | 7/2020 | Rinzler | H04L 63/1466 |

FOREIGN PATENT DOCUMENTS

| | | |
|---|---|---|
| JP | 2003-163975 A | 6/2003 |
| WO | 2018/156943 A1 | 8/2018 |
| WO | 2018/202272 A1 | 11/2018 |

OTHER PUBLICATIONS

Notice of Allowance received for corresponding European Patent Application No. 21717013.3, dated Dec. 1, 2023, 8 pages.

Office action received for corresponding Indian Patent Application No. 202217062585, dated Mar. 10, 2023, 8 pages.

Laman et al., "Using Location-based Social Network Data for Activity Intensity Analysis: A Case Study of New York City", The Journal of Transport and Land Use, vol. 12, No. 1, 2019, pp. 723-740.

Wang et al., "Smart City Development with Urban Transfer Learning", arXiv, Oct. 21, 2018, pp. 1-9.

Rashidi et al., "Exploring the Capacity of Social Media Data for Modelling Travel Behaviour: Opportunities and Challenges", Transportation Research Part C: Emerging Technologies, vol. 75, Feb. 2017, pp. 197-211.

Office action received for corresponding Finnish U.S. Appl. No. 20/205,360, dated Aug. 17, 2020, 8 pages.

Klessig et al., "Twitter as a Source for Spatial Traffic Information in Big Data-Enabled Self-Organizing Networks", IEEE Wireless Communications and Networking Conference (WCNC), Mar. 19-22, 2017, 5 pages.

Kubo et al., "Demand Prediction Based on Social Context for Mobile Content Services", IEEE International Conference on Communications Workshops (ICC), Jun. 5-9, 2011, 5 pages.

Office action received for corresponding Finnish Patent Application No. 20205360, dated Feb. 8, 2021, pp. 1-8.

Yang et al., "Estimating Mobile Traffic Demand Using Twitter", IEEE Wireless Communications Letters, vol. 5, No. 4, Aug. 2016, pp. 380-383.

International Search Report and Written Opinion received for corresponding Patent Cooperation Treaty Application No. PCT/EP2021/058595, dated Jul. 12, 2021, 11 pages.

Hadi et al., "Big data analytics for wireless and wired network design: A survey", Computer Networks, vol. 132, No. 26, Feb. 2018, pp. 180-199.

Office Action received for corresponding Chinese Patent Application No. 202180035122.2, dated Mar. 26, 2025, 6 pages of office action and 4 pages of summary & translation available.

Wenhao et al., "Network Kernel Density Estimation for the Analysis of Facility POI Hotspots", Acta Geodaetica et Cartographica Sinica, vol. 44, No. 12, Dec. 2015, 7 pages.

* cited by examiner

ESTIMATING COMMUNICATION TRAFFIC DEMAND

RELATED APPLICATION

This application claims priority to PCT Application No. PCT/EP2021/058595, filed on Apr. 1, 2021, which claims priority to FI Application No. 20205360, filed on Apr. 6, 2020, each of which is incorporated herein by reference in its entirety.

FIELD

Various embodiments described herein relate to the field of wireless communications and, particularly, to estimating a capacity demand or traffic density in an area of interest.

BACKGROUND

Network planning for building or modifying a cellular network infrastructure aims to estimate a capacity demand in an area. Population density in the area may be used as an input in the network planning, but the density does not necessarily correlate with the capacity demand. For example, the density may be distributed unevenly amongst customers of different network operators. Network planning during operation of the network is possible by monitoring certain key performance indicators that indicate capacity, and by reacting to the results of the key performance indicators.

BRIEF DESCRIPTION

Some aspects of the invention are defined by the independent claims.

Some embodiments of the invention are defined in the dependent claims.

The embodiments and features, if any, described in this specification that do not fall under the scope of the independent claims are to be interpreted as examples useful for understanding various embodiments of the invention. Some aspects of the disclosure are defined by the independent claims.

According to an aspect, there is provided an apparatus comprising at least one processor; and at least one memory including computer program code, wherein the at least one memory and computer program code configured to, with the at least one processor, cause the apparatus to perform the following: forming, by using one or more social media applications, a social media layer storing records of a plurality of places in an area of interest; forming, by using at least one source storing real geolocations of the places, a geolocation layer mapping the places to the real geolocations; classifying the places into a plurality of classes and assigning to each place a weight indicative of a traffic capacity demand dependent on a class of said place; building a capacity layer for the area of interest on the basis of the real geolocations of the places provided by the geolocation layer and the traffic capacity demand per place indicated by the weights, the capacity layer indicating spatial distribution of network traffic capacity demand in a plurality of sub-areas of the area of interest, the plurality of sub-areas comprising sub-areas having at least one of the places and sub-areas between the places.

In an embodiment, the at least one memory and computer program code are configured to, with the at least one processor, cause the apparatus to output the capacity layer for network planning of a cellular network infrastructure.

In an embodiment, the at least one memory and computer program code are configured to, with the at least one processor, cause the apparatus to combine, to the same record in the social media layer, social media data representing the same place, the social media data acquired from at least a first data source and a second data source, wherein social media data acquired from the first data source is considered to represent the same place as social media data acquired from the second data source, if both social media data indicate a location of the place within a certain distance from one another and/or if both social media data indicate the same place by a name with similarity above a determined threshold.

In an embodiment, the at least one memory and computer program code are configured to, with the at least one processor, cause the apparatus to build the capacity layer without measurement data indicating an amount of network traffic.

In an embodiment, the at least one memory and computer program code are configured to, with the at least one processor, cause the apparatus to project the network traffic capacity demand for a sub-area between at least two of the places on the basis of the weights of the at least two of the places.

In an embodiment, the at least one memory and computer program code are configured to, with the at least one processor, cause the apparatus to use the following information as training input for building the capacity layer: a social media layer storing records of other places in another area of interest and, for each of said other places, a one of the plurality of classes to indicate the traffic capacity demand of respective place; and a measured traffic capacity demand at said another area of interest.

In an embodiment, the area of interest represents a first city and said another area of interest represents a second city different from the first city but determined to have social media activity that correlates with social media activity of the first city.

In an embodiment, the at least one memory and computer program code are configured to, with the at least one processor, cause the apparatus to build the capacity layer by at least performing the following: dividing the area of interest into the plurality of sub-areas by using the geolocation layer; computing a traffic capacity demand for each of the plurality of sub-areas by using said weight or weights of a place or places in said sub-area and, further, by using said weight or weights of a place or places in sub-areas that are neighbors to said each of the plurality of sub-areas.

In an embodiment, the at least one memory and computer program code are configured to, with the at least one processor, cause the apparatus to assign the weight further on the basis of a demographic type of the sub-area of the respective place.

In an embodiment, a weight associated with a higher traffic capacity demand is assigned to a determined class in a sub-area having an urban demographic type than to the determined class in a sub-area having a sub-urban or rural demographic type, while a weight associated with a lower traffic capacity demand is assigned to another determined class in a sub-area having an urban demographic type than to said another determined class in a sub-area having a sub-urban or rural demographic type.

In an embodiment, the at least one memory and computer program code are configured to, with the at least one processor, cause the apparatus to acquire information on at least one of building types and building sizes in the area of interest and to use the information on the at least one of building types and building sizes as a further input when building the capacity layer.

In an embodiment, the at least one memory and computer program code are configured to, with the at least one processor, cause the apparatus to store, in the social media layer, addresses of the plurality of places as acquired from the one or more social media applications, to map the addresses to geographical coordinates in the geolocation layer, and to map the plurality of places to the sub-areas by using the geographical coordinates.

According to an aspect, there is provided a computer-implemented method for estimating network traffic capacity demand in an area-of-interest, comprising: forming, by using one or more social media applications, a social media layer storing records of a plurality of places in the area of interest; forming, by using at least one source storing real geolocations of the places, a geolocation layer mapping the places to geolocations; classifying the places into a plurality of classes and assigning to each place a weight indicative of a traffic capacity demand dependent on a class of said place; building a capacity layer for the area of interest on the basis of the real geolocations of the places provided by the geolocation layer and the traffic capacity demand per place indicated by the weights, the capacity layer indicating spatial distribution of network traffic capacity demand in a plurality of sub-areas of the area of interest, the plurality of sub-areas comprising sub-areas having at least one of the places and sub-areas between the places.

In an embodiment, the computer-implemented method further comprises using the capacity layer in network planning of a cellular network infrastructure and selecting locations of cells of the cellular network infrastructure.

In an embodiment, the computer-implemented method further comprises combining, to the same record in the social media layer, social media data representing the same place, the social media data acquired from at least a first data source and a second data source, wherein social media data acquired from the first data source represents the same place as social media data acquired from the second data source, if both social media data indicate a location of the place within a certain distance from one another and/or if both social media data indicate the same place by a name with similarity above a determined threshold.

In an embodiment, the capacity layer is built without measurement data indicating an amount of network traffic.

In an embodiment, the network traffic capacity demand is projected for a sub-area between at least two of the places on the basis of the weights of the at least two of the places.

In an embodiment, the following information is used as training input for building the capacity layer: a social media layer storing records of other places in another area of interest and, for each of said other places, a one of the plurality of classes to indicate the traffic capacity demand of respective place; and a measured traffic capacity demand at said another area of interest.

In an embodiment, the area of interest represents a first city and said another area of interest represents a second city different from the first city but determined to have social media activity that correlates with social media activity of the first city.

In an embodiment, the capacity layer is built by at least performing the following: dividing the area of interest into the plurality of sub-areas by using the geolocation layer; computing a traffic capacity demand for each of the plurality of sub-areas by using said weight or weights of a place or places in said sub-area and, further, by using said weight or weights of a place or places in sub-areas that are neighbors to said each of the plurality of sub-areas.

In an embodiment, the weight is assigned further on the basis of a demographic type of the sub-area of the respective place.

In an embodiment, a weight associated with a higher traffic capacity demand is assigned to a determined class in a sub-area having an urban demographic type than to the determined class in a sub-area having a sub-urban or rural demographic type, while a weight associated with a lower traffic capacity demand is assigned to another determined class in a sub-area having an urban demographic type than to said another determined class in a sub-area having a sub-urban or rural demographic type.

In an embodiment, information on at least one of building types and building sizes in the area of interest is acquired and used as a further input when building the capacity layer.

In an embodiment, the computer-implemented method further comprises storing, in the social media layer, addresses of the plurality of places as acquired from the one or more social media applications, mapping the addresses to geographical coordinates in the geolocation layer, and mapping the plurality of places to the sub-areas by using the geographical coordinates.

According to an aspect, there is provided a computer program product embodied on a computer-readable medium and comprising a computer program code readable by a computer for an apparatus of a first wireless network, wherein the computer program code configures the computer to carry out a computer process for estimating network traffic capacity demand in an area-of-interest, comprising: forming, by using one or more social media applications, a social media layer storing records of a plurality of places in the area of interest; forming, by using at least one source storing real geolocations of the places, a geolocation layer mapping the places to geolocations; classifying the places into a plurality of classes and assigning to each place a weight indicative of a traffic capacity demand dependent on a class of said place; building a capacity layer for the area of interest on the basis of the real geolocations of the places provided by the geolocation layer and the traffic capacity demand per place indicated by the weights, the capacity layer indicating spatial distribution of network traffic capacity demand in a plurality of sub-areas of the area of interest, the plurality of sub-areas comprising sub-areas having at least one of the places and sub-areas between the places.

In an embodiment, the computer program product further comprises a computer program code for configuring the computer to carry out any one of the above-described embodiments of the computer-implemented method.

LIST OF DRAWINGS

Embodiments are described below, by way of example only, with reference to the accompanying drawings, in which FIG. 1 illustrates cellular network planning;

DESCRIPTION OF EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
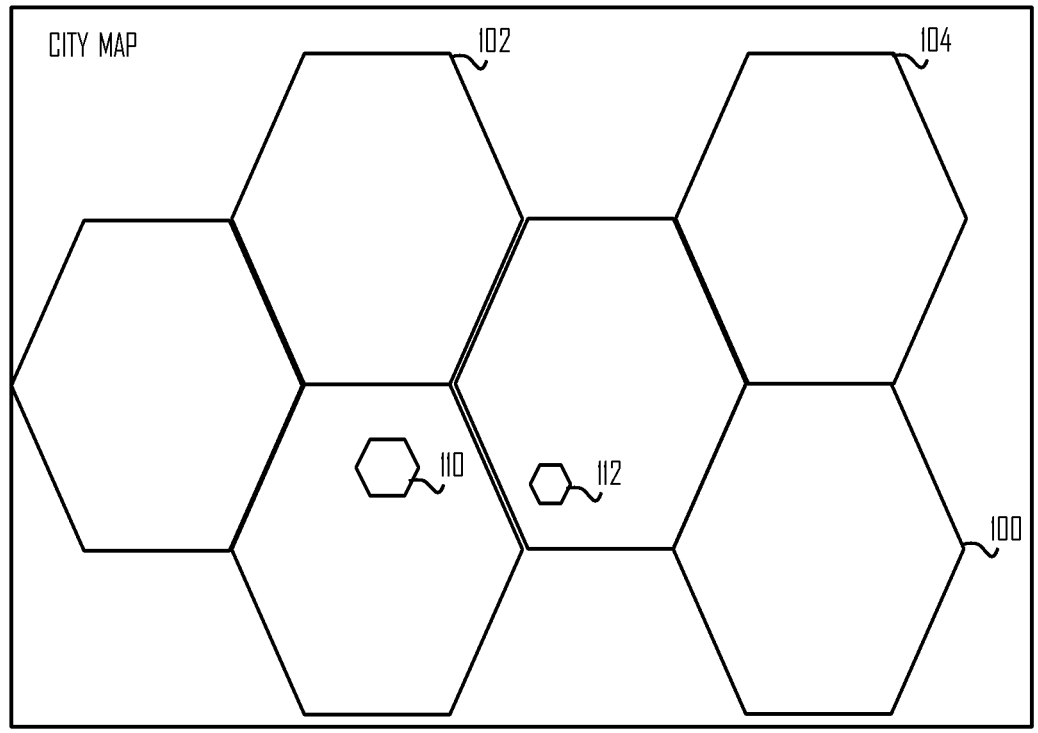

FIG. 1 illustrates a concept of a cellular coverage of a cellular communication system. The cellular communication system may be any system from second generation systems such as Global System for Mobile Communications to modern systems such as long term evolution advanced (LTE Advanced, LTE-A) or new radio (NR, 5G), without restricting the embodiments to any architecture. The embodiments may also be applied to other kinds of communications networks. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), wideband code division multiple access (WCDMA), or any combination thereof.

Referring to FIG. 1, one aspect of planning of the cellular network is to provide coverage in every part of an area of interest (AOI), e.g. where a cellular network operator chooses to provide coverage. Cities and other areas with high population density are of particular interest because of the high number of users of communication services. In such areas, special interest may be put into providing not only coverage but also sufficient communication service capacity that meets the communication service demand. Nowadays, people are mobile and, as a consequence, estimating the service demand in an area is not easy. On the level of macro cells 100, 102, 104 covering a large area, the estimation is easier because of the larger area where the service demand is more stable. However, estimating a service demand for a smaller area such as for a building or for each building in a city is both time-consuming and inaccurate. It is time-consuming in the sense that each building must be evaluated separately. It is inaccurate in the sense that mobility of people in a small area is unpredictable. Therefore, estimating a demand for small cells 110, 112 or hotspots inside the macro cells is more demanding.

A geographical coverage area of a cellular communication system may comprise a plurality of different kinds of radio cells. Radio cells may include the macro cells 100, 102, 104 (or umbrella cells) that are large cells, usually having a diameter of up to tens of kilometers. Within the macro cells, smaller cells such as micro-, femto- or picocells may be established to provide local hotspots to improve the service capacity. A modern cellular communication system may be implemented as a multilayer network including several kinds of cells. Typically, in multilayer networks, one access node or a base station (eNB, gNB in some system specifications) provides one type of a cell or cells, and a plurality of are required to provide such a network structure.

Figure 2:
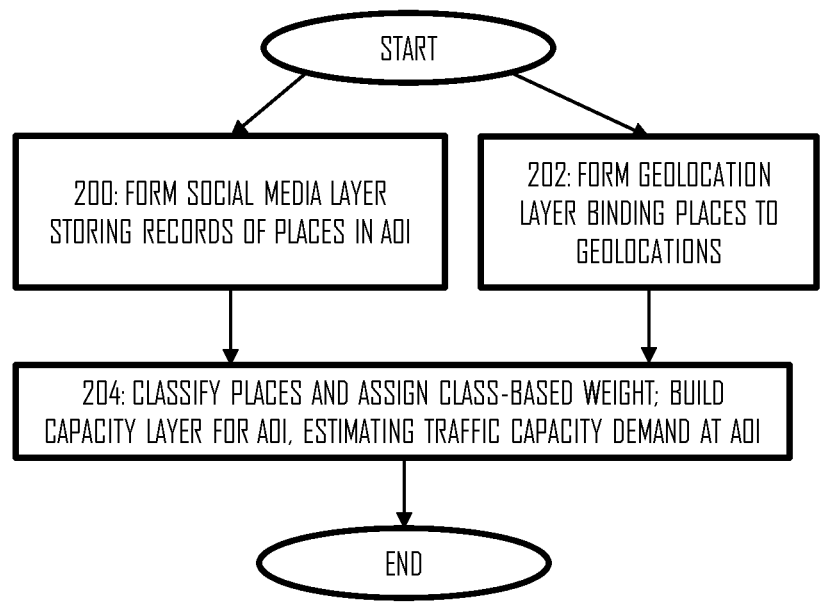
FIG. 2 illustrates an embodiment of a process for estimating a communication service capacity demand for an area-of-interest.

FIG. 2 illustrates an embodiment of a computer-implemented process for estimating a communication service demand in an area of interest. Referring to FIG. 2, the process comprises as performed by at least one processor or a computer processing system: forming (block 200), by using one or more social media applications, a social media layer storing records of a plurality of places in the area of interest; forming (block 202), by using at least one source storing real geolocations of the places, a geolocation layer mapping the places to geolocations; classifying (block 204) the places into a plurality of classes and assigning to each place a weight indicative of a traffic capacity demand dependent on a class of said place; and building (block 204) a capacity layer for the area of interest on the basis of the real geolocations of the places provided by the geolocation layer and the traffic capacity demand per place indicated by the weights, the capacity layer indicating spatial distribution of network traffic capacity demand in a plurality of sub-areas of the area of interest, the plurality of sub-areas comprising sub-areas having at least one of the places and sub-areas between the places. There are various social media applications that allow mapping of locations of users to various places such as cafes, restaurants, hotels, etc. Examples of such applications include Facebook, Twitter, Foursquare, Google Places, Yellow Pages, etc. Such applications may be used as sources for social media data that allows estimation of locations of masses of people and the distribution of the people. They typically provide mapping between the people and places and indication of locations of the places. However, depending on the application, the location may have low geographical accuracy. Some applications use satellite positioning to provide the location for the site. The satellite positioning may be inaccurate, depending on the system and the location of the user when performing the satellite positioning. The positioning error may be dozens of meters or even more, which renders such sources poorly applicable for estimating traffic demand in a very small AOI, e.g. 100 square meters. Some social media application allow registration of an address of the place, but the registered address may be inaccurate in terms of its real geolocation, e.g. because of the inaccurate geographical positioning capabilities of the social media applications. The embodiment of FIG. 2 uses the geographical layer to bind the places to correct geographical locations (coordinates) by using a more accurate data source for the locations of the places. Such sources may indicate, for example, an address of each place that can be mapped to a geographical map of the AOI. Another data source for the geographical layer may be a navigation application storing locations of the places. One example of such a navigation application is HERE® application. Another example of the data source for the geographical layer is Google Places that provides more accurate geographical locations of the places than Facebook, Twitter, Foursquare etc. With the places bound to their correct geographical locations, more accurate estimate of the traffic capacity demand can be made, thus providing a more accurate capacity layer.

In an embodiment, if a source of social media data is determined to provide accurate locations of the places, block 202 may utilize the locations of the place as acquired from the source of social media data. An example of such an accurate source is Google Places.

In an embodiment, the capacity layer is used for network planning of a cellular network infrastructure. In the respect, the capacity layer may be understood to represent an average or static traffic capacity demand distribution in the area of interest. This may be understood in terms of constant, periodic, or otherwise regular tendency in the traffic capacity demand, facilitating the network planning. The locations of the cells, in particular the small cells, may be determined on the basis of the capacity layer. However, the capacity layer may be used for other purposes as well.

In an embodiment, the social media layer stores, for each place, a number of users that have checked in at the place by using the one or more social media applications. The number of check-ins may be used as an input for assigning the weight for the particular place. A check-in may be understood in the contrast of the social media applications. If a person has written a review of a place in a social media application, e.g. TripAdvisor, the person has checked in at the place. If the person has indicated a visit at a place in a social media application such as Facebook, Twitter, or Foursquare, the person has checked in at the place. Many social media applications track the number of check-ins for each place that can be used directly as the input.

In an embodiment, the capacity layer is built without measurement data indicating an amount of network traffic measured in one or more wireless networks in the AOI. The measured traffic may be used as an additional input for assigning the weights, e.g. for the network planning and determining the cell location, or the measured traffic may be used for training execution of block 204, but it is not mandatory. The social media layer provides an indication of the people distribution in the AOI while the geolocation layer binds the places to correct geographical locations. The indication of the people distribution may include information on check-ins to places in the AOI, ratings of the places in the AOI, open hours of the places in the AOI, etc.

As described above, the places may be classified. A class may define the economic, communal, or social function of the place, e.g. café, restaurant, church, residential building, office, governmental building, etc. It may be used as additional input when building the social media layer and, consequently, the capacity layer. For example, Google Places Application Programming Interface (API) is a tool for finding such places. It also provides one classification for the places and may thus be useful for the classification. The classification may be used for weighting the traffic capacity demand per user in the places or areas of interest. For example, a certain number of check-ins and/or ratings etc. may set a different traffic capacity demand at a café than at a church. As another example, the classification may indicate the traffic capacity demand without the number of observed check-ins. In such a case, the weighting may rely on statistical assumptions, measurements, or observations for each class. For example, a café may be assigned with a certain traffic capacity demand, a church may be assigned with a different traffic capacity demand, etc. Each class may have a unique weight for the traffic capacity demand and, by using the weights and the locations of a sufficient number of places in the AOI, statistical significance for the total traffic capacity demand and its distribution may be derived for the AOI.

The social media layer may be understood as a database or a data structure storing the social media data linking the users to the places. The data structure may comprise a record for each place, the recording comprising a name or another identifier of the place and a number of users linked to the place. Additionally, the record may store other information related to the place and acquired from the social media applications. Such other information may be indicative of a traffic capacity demand at the location of the place, e.g. traffic capacity per user, and may include user rating of the place and/or open hours of the place, for example. The social media layer may be built on the basis of social media data acquired from publicly available sources, and/or it may be built on the basis of social media data that is commercially available.

After the capacity layer has been built, the social media layer may be deleted. Some sources may specify temporal limits for the acquired social media data. In any case, the purpose of the social media layer may be to build the capacity layer and, once the capacity layer has been built, the social media layer may not be needed anymore and can be discarded.

Figure 3:
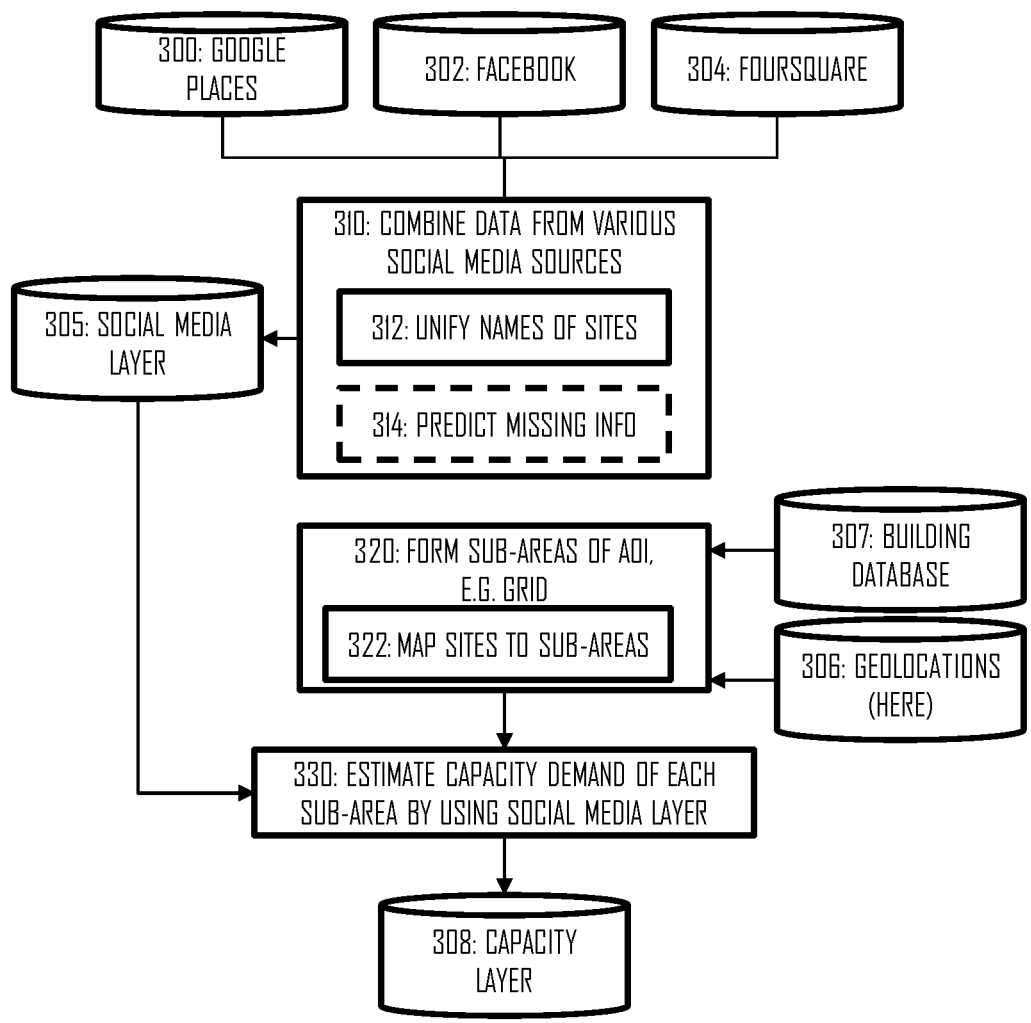
FIG. 3 illustrates some embodiments of the process of FIG. 2.

Let us then describe some embodiments of the process of FIG. 2 with reference to FIG. 3. FIG. 3 describes various embodiments of blocks 200 to 204, and the various embodiments are considered to be independent of one another. Referring to FIG. 3, the social media data may be stored in various databases, separately for each social media application. Examples include a Google Places database 300, a Facebook database 302, Foursquare database 304. A computer system executing the process of FIG. 3 may access such databases and acquire the social media data that links users to the places. Such social media data may include the check-in data, user rating data per place, and/or other information indicating that the user has visited the place at the geolocation of the place. As a result of acquiring the social media data from the databases, the computer system may build a database comprising a record for each discovered site.

Various social media applications and databases may store the same or similar information by a different name or class. For example, a name for a place in one database may differ from a name for the same site in another database. Further, the different databases may use different classifications for the same place. Yet further, the different databases may store the location of the place as an address or geographical coordinates, but the accuracy of the location may vary, as mentioned above. Therefore, the database may at this stage include records that are duplicates of the same place, and the records may store the same or different information on the same place. In block 310, the computer system may combine the social media data representing the same place but gathered from the different social media sources. In an embodiment, the computer system combines, to the same record in the social media layer 305, social media data representing the same place. Fuzzy logic or another scheme may be used in the combining. The combining may follow the following principle. Social media data acquired from a first data source may be considered to represent the same place as social media data acquired from the second data source, if both social media data indicate a location of the place within a certain distance from one another and/or if both social media data indicate the same place by a name with similarity above a determined threshold. The similarity in the name of the place may require, for example, at least 70% similarity, at least 80% similarity, or 90% similarity, and the threshold may be set accordingly. The certain distance may be determined, for example, on the basis of an average estimated inaccuracy of the most inaccurate social media source. Examples include less than 80 meters, less than 70 meters, or less than 60 meters. Using both conditions (name and distance) naturally improves the performance of combining those records that truly represent the same place. The combining may include unifying the names of the places (block 312), e.g. an official name of the place may be maintained and other names discarded. An example of the result of the combining is illustrated in an Table 1 below. The number of places may be significantly higher, obviously.

TABLE 1

| Google Name | FB Name | Google Type | FB Type | FB checkins | Google Rating | FB Rating | Google Rating Count | FB Rating Count |
|---|---|---|---|---|---|---|---|---|
| Grafica Colores | Colores | Store | Shop | 45 | 4.5 | 4.2 | 20 | 14 |
| Café Flanco ltd. | Cafe Flanco | Bar | Café | | | | | |
| By Pass S.R.L | Bypass SRL | Church | Place of worship | 124 | 4.2 | | 10 | |
| ... | ... | ... | ... | ... | ... | ... | ... | ... |

As illustrated in Table 1, the social media data may include various information for different places, and some information that is present of one place may be missing from a record of another place. An embodiment of the process include block 314 where the computer system predicts missing information of a place by using available information for the place and/or for other places as an input, e.g. to a random forest algorithm. Another algorithm can be alternatively used. The algorithm may fill in the missing pieces of information on the basis of the information available for other sites. For example, the filling logic may use an average of other places of the same type and having similar other characteristics. For example, the Google Rating for Café Flanco may be computed as an average of Google Ratings of other cafés in the same or similar area as Café Flanco. The similar area may be understood in a context of similar socioeconomical or a demographic class of the area in terms of 'urban', 'suburban', 'rural', etc. As a result of block 314, the social media layer 305 of Table 1 may be modified into the form of Table 2 where at least some of the missing pieces of information are filled with the prediction.

TABLE 2

| Google Name | FB Name | Google Type | FB Type | FB checkins | Google Rating | FB Rating | Google Rating Count | FB Rating Count |
|---|---|---|---|---|---|---|---|---|
| Grafica Colores | Colores | Store | Shop | 45 | 4.5 | 4.2 | 20 | 14 |
| Café Flanco ltd. | Cafe Flanco | Bar | Café | 30 | 4.6 | 3.9 | 8 | 5 |
| By Pass S.R.L | Bypass SRL | Church | Place of worship | 124 | 4.2 | 3.5 | 10 | 50 |
| ... | ... | ... | ... | ... | ... | ... | ... | ... |

Upon executing block 310, the computer system may store or update the social media layer in a database 305 storing the social media layer.

As a result of block 202, the database of following Table 3 may be built for the AOI. The location coordinates may be acquired from a source that provides accurate location data for the places comprised in the social media layer, e.g. HERE or Google Places. In some embodiments, the social media layer may readily comprise coordinates as acquired from the sources of the social media data. However, as described above, such coordinates may be inaccurate. Therefore, block 202 may be executed to correct such inaccuracies. Block 202 may be used to harmonize the location coordinates readily available in the social media layer from multiple social media sources. For example, Google Places may provide accurate location coordinates for a place by using real geolocations of the place while Facebook may provide inaccurate location coordinates for the place as acquired from a satellite positioning receiver. Block 202 may then discard the location coordinates deemed inaccurate and maintain only the accurate location coordinates for the place. The discarding may be based on the beforehand knowledge or classification of the social media applications into those providing sufficient accuracy in the location coordinates and those not providing sufficient accuracy in the location coordinates. In case the accurate location coordinates are missing, the external geolocation source such as HERE may be used to provide the accurate location coordinates for the place(s).

TABLE 3

| Name | Address | Longitude | Latitude | Floor |
|---|---|---|---|---|
| Grafica Colores | Avenue X | 901430 | 6950011 | 3 |
| Café Flanco ltd. | Street Y | 901231 | 6953245 | 1 |
| By Pass S.R.L | Street Y | 901231 | 6953245 | 3 |
| ... | ... | ... | ... | ... |

Block 204 may then combine Tables 2 and 3 and, as a result, provide the capacity layer in the form of Table 4, for example. Table 4 may be built on the basis of combined Tables 2 and 3 by using a machine learning model configured to analyze the information stored in the combined Tables 2 and 3. The machine learning model may be trained by using real measurement data, as described in some embodiments below.

TABLE 4

| Longitude | Latitude | Floor | Traffic Capacity Demand |
|---|---|---|---|
| 901430 | 6950011 | 3 | 50 |
| 901231 | 6953245 | 1 | 45 |
| 901231 | 6953245 | 3 | 34 |
| ... | ... | ... | ... |

Table 4 illustrates the traffic capacity demand for subareas within the AOI. As described below. In the embodiment of Table 4, a three-dimensional capacity layer taking into account floors of buildings is built. Another embodiment excludes the third dimension (the floors). The traffic capacity demand may describe a traffic weight for the location of the coordinates. As a consequence, the capacity layer may indicate a relative traffic capacity demand for various sub-areas within the AOI. The number of people in the AOI, e.g. population, may then be distributed to the sub-areas in order to convert the relative capacity demand to an absolute demand, e.g. for cellular network planning such as small cell placement design. The size of the sub-areas may be selected according to an objective of the capacity layer. For example, if the objective is network planning of small cells, the size of the sub-areas may be smaller (e.g. 20 meters by 20 meters) than if the objective is network planning of macro cells (e.g. 100 meters by 100 meters).

The AOI may be divided into a plurality of sub-areas, and the traffic capacity demand computed per sub-area, as illustrated in Table 4. For that purpose, block 320 may include retrieving, from the geolocation database, places that are located to the AOI, and mapping (block 322) places to the sub-areas. The set of sub-areas may form, for example, a grid covering the (whole) AOI. As a result, each place in the AOI is assigned to a sub-area. Each sub-area may thus be understood as a bin for the traffic capacity demand estimation, the bin comprising multiple places that contribute to the capacity demand estimate for the sub-area. As described above in connection with FIG. 2, there may be sub-areas comprising one or more of the places and sub-areas that are between the places. Some sub-areas may have not place mapped therein, and the traffic capacity demand may still be projected to such sub-areas on the basis of the traffic capacity demand determined on the basis of places mapped to one or more neighboring sub-areas.

Figure 4:
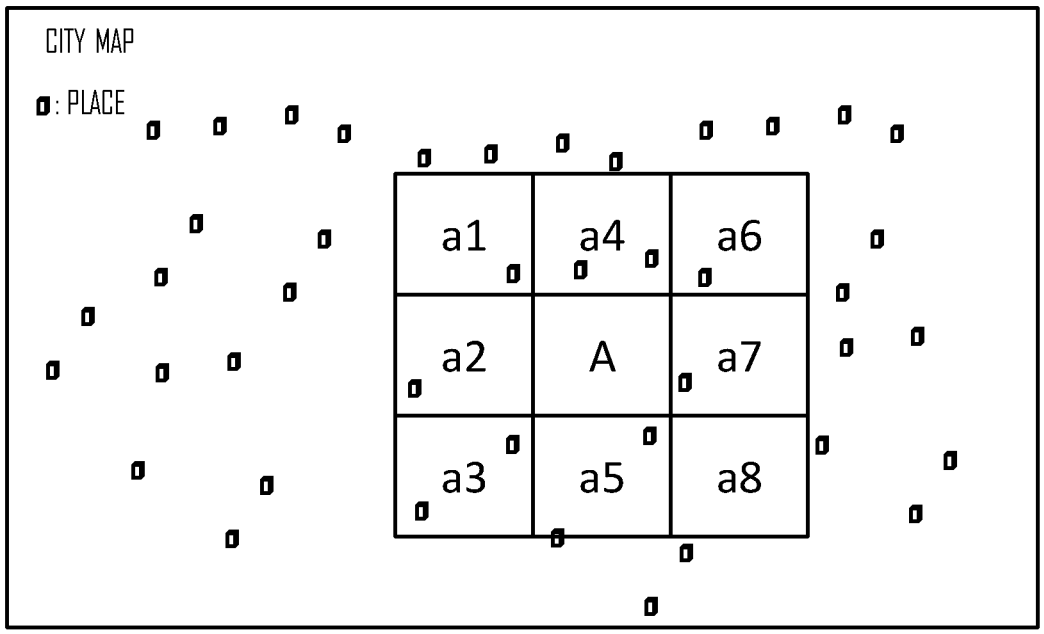
FIG. 4 illustrates how a capacity layer is built by dividing the area-of-interest into a grid.

Thereafter, in block 330 the capacity demand (e.g. Table 4) may be computed for each sub-area by using the social media data stored in the social media layer as linked to said each sub-area. In other words, computing the capacity demand for a sub-area (may also be called a bin) may take into account at least the social media data stored in records of those places mapped to the sub-area (if any). In a further embodiment, computing the capacity demand for the sub-area may also use information stored in the social media layer as linked to a determined number of sub-areas that are neighbors to the sub-area. FIG. 4 illustrates this embodiment.

Referring to FIG. 4, when estimating the capacity demand for a sub-area A, the computer system may take into account the social media data of the places mapped to the sub-area A and, additionally, the social media data of the places mapped to the sub-areas around the sub-area A (a1 to a8). Depending on the embodiment, even sub-areas around the sub-areas a1 to a8 may be taken into account. Accordingly, averaging can be achieved. It may be useful, for example, in the situation illustrated in FIG. 4 where the sub-area A comprises no places mapped thereto. However, the sub-areas a1 to a8 around the sub-area contain several places, thus probably affecting the traffic capacity demand in the sub-area A as well. Equation below provides an example of estimating the traffic capacity demand T per sub-area A:

$$T_A = Y1^*(\text{number of places of class 1})_A + Y2^*(\text{number of places of class 2})_A + \ldots + m_A + Y1^*(\text{number of places of class 1})_{a1} + Y2^*(\text{number of places of class 2})_{a1} + \ldots + m_{a1} + \ldots + Y1^*(\text{number of places of class 1})_{ax} + Y2^*(\text{number of places of class 2})_{ax} + \ldots + m_{ax}$$

The variables Y1, Y2, . . . represent the weights that may be defined per class, as described above. Parameter $m_{a1}$ to $m_{ax}$ represents a constant that may be determined, for example, on the population or population density in the particular sub-area and/or other factors. Further parameters may be taken into the Equation, e.g. the number of check-ins per place. The Equation above is based on a linear model that is a simplified example. In other embodiments, another regression model is used.

As described above, the social media data indicating the weight per place in the AOI or the sub-area is indicative of the (relative) traffic capacity demand in the AOI or the sub-area. Also, the number of places in the AOI or the sub-area is also proportional to the traffic capacity demand in the AOI or the sub-area. The rating or the number of check-ins is also proportional to the number of people per place. A place with high rating and high rating count for a first place may be indicative of a higher number of users than for a second place with lower rating and lower rating count. The opening hours may provide capability of estimating temporal characteristics of the traffic capacity demand. For example, the traffic capacity demand may be estimated to be higher during opening hours than outside the opening hours of the places in an AOI. These parameters as combined provide an indication of a relative number of people in the AOI or the sub-area.

As described above, the classification of the places may also be taken into account in block 330. For example, a traffic capacity demand per user may be determined on the basis of a class of the place. The computer system may assign different weights for the traffic capacity demand per user or per place in the different classes. For example, the traffic capacity demand may be set higher for a hotel or a café than for the church. Also the temporal characteristics may be taken into account, as described above.

In an embodiment, the weights for the places are assigned further on the basis of a demographic type of the sub-area of the respective place. The demographic types may include urban, suburban, rural, etc. For example, a bar or a church in an urban area may be assigned with a different weight than a bar or church in a rural area. A bar in the urban area may be linked to a higher traffic capacity demand than a bar in the rural area. In general, a place of a specific class and located in an urban sub-area may be assigned with a weight indicating a higher traffic capacity demand than a place of the specific class and located in a suburban sub-area. Similarly, the place of the specific class and located in the suburban sub-area may be assigned with a weight indicating a higher traffic capacity demand than a place of the specific class and located in a rural sub-area. However, some classes may be observed to have a reversed effect. For example, a church in a specific rural area may be associated with a higher traffic capacity demand than a church in the urban area. This may result from the number of visitors per church being higher in the rural area(s) in the particular AOI. Accordingly, a weight associated with a higher traffic capacity demand may be assigned to a determined class in a sub-area having an urban demographic type than to the determined class in a sub-area having a sub-urban or rural demographic type, while a weight associated with a lower traffic capacity demand may be assigned to another determined class in a sub-area having an urban demographic type than to said another determined class in a sub-area having a sub-urban or rural demographic type. In summary, the demographic type and the classification of the places may provide independent variables to the traffic capacity demand.

The demographic type of the AOI or a sub-area within the AOI may be determined by various means. For example, a demographic database may be provided where a city, for example, is divided into demographic areas, each area being specified according to a particular demographic type. As a consequence, direct mapping for the AOI and/or sub-areas of the AOI can be derived from the demographic database. In another embodiment, the demographic type for the AOI or a sub-area is determined on the basis of the places within the area. For example, if the AOI or sub-area (together with a determined number of neighbor sub-areas) comprises at least a determined number of bars, cafés, or restaurants, it is determined to be urban or sub-urban. If the AOI or sub-area includes only residential buildings and a few communal or commercial places, it may be determined to be rural. Accordingly, the demographic type may be detected by observing the number and classifications of the places in the AOI or a particular sub-area. In yet another embodiment, the demographic type is given. For example, if the AOI covers only a downtown of a city, the AOI and all the sub-areas are urban by default.

In an embodiment, a building layer providing information on buildings in the AOI is built. The building layer may comprise attributes for height, or geographical area of the buildings, and/or other building size attributes. The information on the buildings in the AOI may be used as an indication of the capacity demand. For example, a large residential building may have a higher capacity demand than a small house. Some buildings may have less information in the social media layer but still relate to high or significant capacity demand. Therefore, this embodiment uses such a building layer or a building database 307 storing information on the buildings in the AOI. The information on the buildings may include information on building size in terms of one or more of height, type of building (residential, communal, governmental, industrial, commercial, etc.), land area covered by the building, etc. The information on the buildings may be acquired from various sources. For example, information on the buildings may be acquired from commercial sources (bought), from free sources such as open street maps, from satellite images, etc. Machine learning may be applied to adapt the information into a useful form for building the capacity layer. For example, machine learning may be applied to satellite images to distinguish the size and geographical locations of the buildings, and the machine learning may cross-reference the social media layer to determine the type of the building. As described above, the social media layer contains information on the types of the places in the AOI. If a building distinguished by a machine learning algorithm from one or more satellite images is determined to include at least a certain number of places, as indicated by the social media layer, the building may be denoted as a commercial building. If the building is large and contains less than a certain number of places, it may be determined to be a residential building, unless the social media layer or another information links the building type otherwise. The computer system executing block 330 may then use the building information in the AOI as a further input for estimating the capacity demand, thus providing more accurate estimate of the capacity demand.

The machine learning building the database 305 or executing block 330 may use the above-described logic when mapping the information on the buildings to the traffic capacity. A larger building is mapped to a higher capacity demand than a smaller building. Each building type may be mapped to a certain capacity demand per user, and the size of the building and the social media layer for the building may be used to estimate the number of users, thus providing overall capacity demand for the building. Other logic may be additionally or alternatively implemented.

In an embodiment, the buildings are used to form 'a grid' and replace the grid formed as described above in connection with FIG. 4. In such a case, the buildings may be understood as the sub-areas, and the places are mapped to the buildings in block 322. As a consequence, the building database 307 provides an input to block 320.

In an embodiment, the building database 307 is comprised in the geolocations database 306. For example, the building database may provide the third dimension (height) to the geolocation database 306. When using the embodiment of FIG. 4 or, in general, the division of the AOI to sub-areas, the buildings may also be mapped to the sub-areas in block 322. Then, the information on the buildings may be used to estimate a capacity demand per sub-area. For example, the height or size of the buildings in each sub-area may be taken into account in the embodiments computing the capacity layer. An average building height or size may be computed per sub-area for the capacity layer computation.

Figure 5:
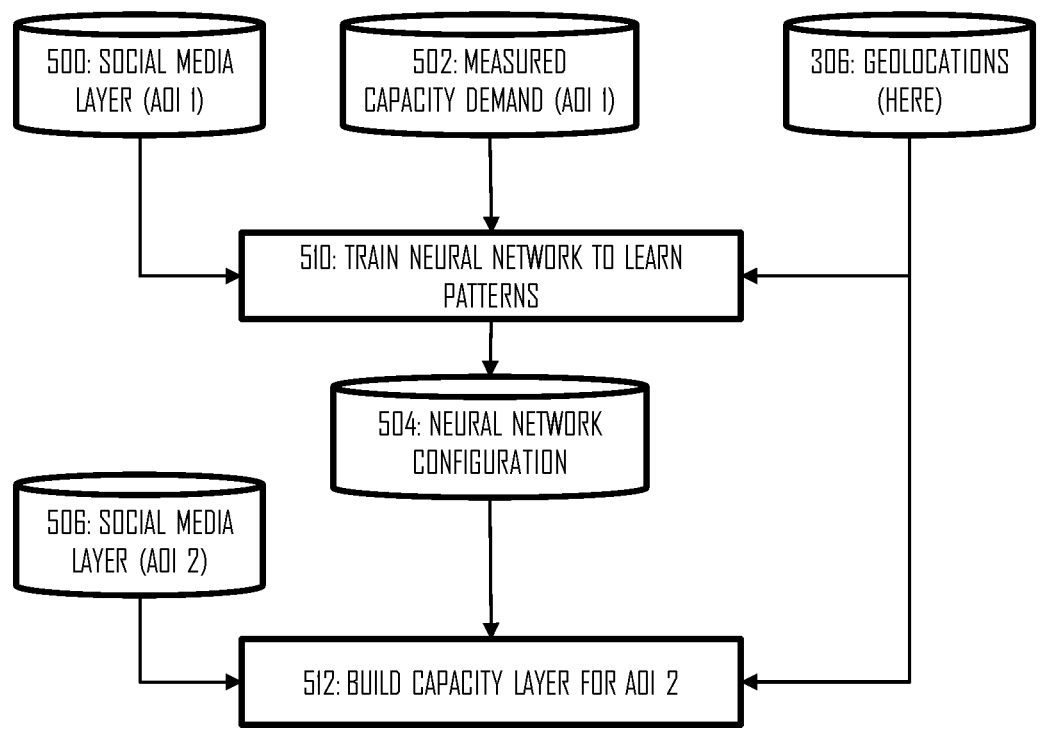
FIG. 5 illustrates training a machine learning algorithm and using the trained machine learning in building the capacity layer.

As described above, the capacity layer may be built even without any measurement data related to measuring the amount of network traffic in the AOI. In an embodiment, such measurement data may be used when training a machine learning algorithm executing the process of FIG. 2 or at least block 204 or 330. In such an embodiment, the computer system may use the following information as a training input for building the capacity layer: the social media layer for another AOI; and a measured traffic capacity demand at said another AOI. If there is correlation in social media activity between two AOIs, the social media layer of one AOI may be used in training the machine learning algorithm, e.g. a neural network, and thereafter the computer system may build the capacity layer on the basis of the social media layer without the measurement data. The geolocation layer may be used to improve the positioning of the places. In an embodiment, the AOI represents a first city and said another AOI represents a second city different from the first city. Accordingly, when the social media activity between the cities correlates, the capacity layer for said another city also correlates with the real traffic capacity demand. For example, the social media activity is typically similar in different cities of the same country or in otherwise similar cities of different countries. FIG. 5 illustrates these embodiments.

Figure 6:
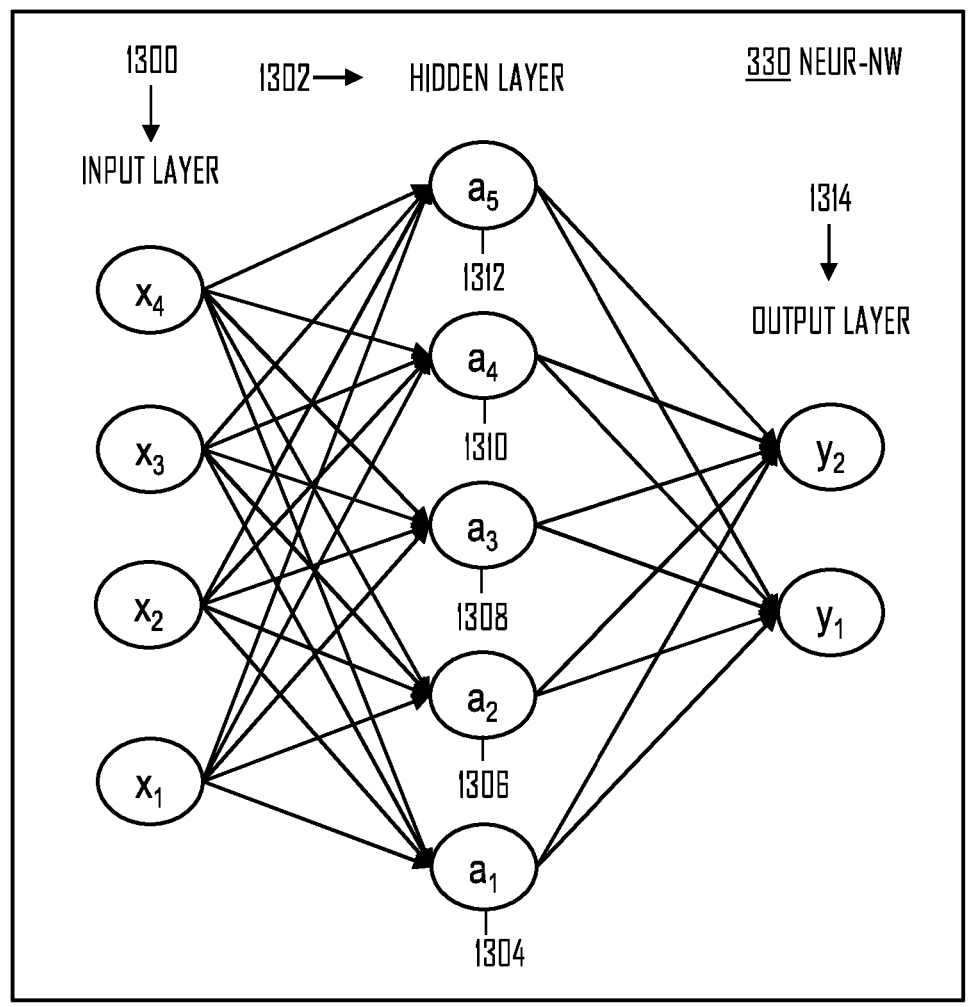
FIGS. 6 and 7 illustrate structure and operation of a machine learning.
Figure 7:
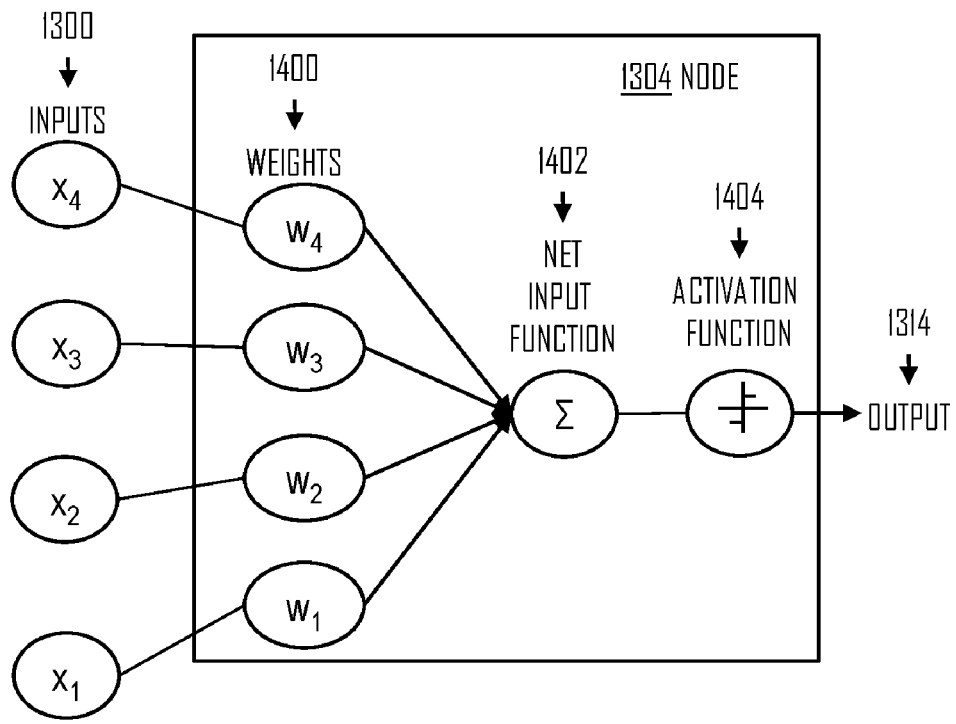

Referring to FIG. 5, a machine learning algorithm is trained in block 510. The machine learning algorithm may employ neural network, or another regression model. FIG. 6 illustrates an embodiment of the neural network (executing block 330, for example) with one hidden layer, and FIG. 7 illustrates an embodiment of a computational node of the neural network.

Deep learning (also known as deep structured learning or hierarchical learning) is part of a broader family of machine learning methods based on the layers used in artificial neural networks.

An artificial neural network (ANN) comprises a set of rules that are designed to execute tasks such as regression, classification, clustering, and pattern recognition. The ANNs achieve such objectives with a learning procedure, where they are shown various examples of input data, along with the desired output. With this, they learn to identify the proper output for any input within the training data manifold. Learning by using labels is called supervised learning and learning without labels is called unsupervised learning.

Deep learning typically requires a large amount of input data. In this case is used supervised learning.

A deep neural network (DNN) is an artificial neural network comprising multiple hidden layers 1302 between the input layer 1300 and the output layer 1314. Training of DNN allows it to find the correct mathematical manipulation to transform the input into the proper output even when the relationship is highly non-linear and/or complicated.

Each hidden layer 1302 comprise nodes 1304, 1306, 1308, 1310, 1312, where the computation takes place. As shown in FIG. 7, each node 1304 combines input data 1300 with a set of coefficients, or weights 1400, that either amplify or dampen that input 1300, thereby assigning significance to inputs 1300 with regard to the task the algorithm is trying to learn. The input-weight products are added 1402 and the sum is passed through an activation function 1404, to determine whether and to what extent that signal should progress further through the network 330 to affect the ultimate outcome, such as an act of classification. In the process, the neural networks learn to recognize correlations between certain relevant features and optimal results.

In the case of classification, the output of deep-learning neural network may be considered as a likelihood of a particular outcome, such as in this case a probability of decoding success of a data packet. In this case, the number of layers 1302 may vary proportional to the number of used input data 1300. However, when the number of input data 1300 is high, the accuracy of the outcome 1314 is more reliable. On the other hand, when there are fewer layers 1302, the computation might take less time and thereby reduce the latency. However, this highly depends on the specific DNN architecture and/or the computational resources.

Initial weights 1400 of the model can be set in various alternative ways. During the training phase they are adapted to improve the accuracy of the process based on analyzing errors in decision making. Training a model is basically a trial and error activity. In principle, each node 1304, 1306, 1308, 1310, 1312 of the neural network 330 makes a decision (input*weight) and then compares this decision to collected data to find out the difference to the collected data. In other words, it determines the error, based on which the weights 1400 are adjusted. Thus, the training of the model may be considered a corrective feedback loop.

Typically, a neural network model is trained using a stochastic gradient descent optimization algorithm for which the gradients are calculated using the backpropagation algorithm. The gradient descent algorithm seeks to change the weights 1400 so that the next evaluation reduces the error, meaning the optimization algorithm is navigating down the gradient (or slope) of error. It is also possible to use any other suitable optimization algorithm if it provides sufficiently accurate weights 1400. Consequently, the trained parameters 332 of the neural network 330 may comprise the weights 1400.

In the context of an optimization algorithm, the function used to evaluate a candidate solution (i.e. a set of weights) is referred to as the objective function. Typically, with neural networks, where the target is to minimize the error, the objective function is often referred to as a cost function or a loss function. In adjusting weights 1400, any suitable method may be used as a loss function, some examples are mean squared error (MSE), maximum likelihood (MLE), and cross entropy.

As for the activation function 1404 of the node 1304, it defines the output 1314 of that node 1304 given an input or set of inputs 1300. The node 1304 calculates a weighted sum of inputs, perhaps adds a bias and then makes a decision as "activate" or "not activate" based on a decision threshold as a binary activation or using an activation function 1404 that gives a nonlinear decision function. Any suitable activation function 1404 may be used, for example sigmoid, rectified linear unit (ReLU), normalized exponential function (softmax), sotfplus, tanh, etc. In deep learning, the activation function 1404 is usually set at the layer level and applies to all neurons in that layer. The output 1314 is then used as input for the next node and so on until a desired solution to the original problem is found.

As the input layer of the neural network, block 510 may use the combined social media layer 500 and geolocation layer 306 for one AOI (AOI 1). As an output layer of the neural network, block 510 may use a capacity layer formed on the basis of the measured traffic capacity demand for the AOI 1 (502). Then, block 510 may execute updating of the neural network nodes. The configuration of thus trained neural network may then be stored in a database 504. A similar training may be performed for the other machine learning algorithms. The social media layer, with the corrected geolocations from the geolocation layer 306, and the measured (true) traffic capacity demand may be used to train the machine learning. The machine learning may also be trained to determine the appropriate weights per class. As described above, the social media layer 500 together with the geolocations layer enables the machine learning algorithm to map the places in the AOI 1 to determine the spatial distribution of the places in the AOI 1. Further, the measured capacity demand 502 may indicate the spatial distribution of the traffic capacity demand in the AOI 1. When the number of places is statistically significant, the machine learning may, on the basis of this information, estimate the effect of each class to the traffic capacity demand and, as a consequence, assign the appropriate weight to each class.

When a task is issued to compute the capacity layer to another AOI (AOI 2), execution of block 512 may be issued. Block 512 may include retrieving the configuration of the neural network from the database 502 and using a combined social media layer 506 and geolocation layer 306 for the AOI 2 as an input layer to thus configured neural network. Block 512 may also comprise measuring the output layer of the neural network, thus acquiring the capacity layer for the AOI 2.

With the assumption that the social media activity is similar in the AOI 1 and AOI 2, the weights determined for the AOI 1 on the basis of the measurements 502 used as the training input can be deemed accurate also for AOI 2. As a consequence, the spatial distribution of the places in the AOI 2 and their classes, acquired from the social media layer with the help of the geolocation layer for the AOI 2 enables determining the spatial distribution of the traffic capacity demand in the AOI 2.

In cases where there is known difference in social media activity between two AOIs, the above-described weighting may be modified when training the neural network for another AOI. For example, the social media layer acquired from the database 500 for AOI 1 may be modified on the basis of the known difference so that it provides a higher correlation with the real social media activity of AOI 2. The known difference may be used in the modification to correct the differences in the social media activities between the AOIs 1 and 2. For example, if it is known that the users use the cellular communication services in hotels more in the AOI 2 than in AOI 1, a higher capacity demand weight may be assigned to users of the AOI 2 linked to the hotels. Similar modification may be performed for the other place classes, if there is known difference in the behavior between the AOIs.

Another machine learning algorithm employs a regression model for the capacity demand estimation, e.g. for predicting users in an AOI. As known in the art, a regression model can be understood as a function $$Y=X1*m+X2*n+X3*o+X4*p \ldots$$

where X1 and X2 are the variables acquired from the Tables above for a specific sub-area-of-interest (A). X1 may represent the user rating for a first place, X2 a number of users checked in at the first place, X3 the user rating for a second place, X4 a number of users checked in at the second place, and so on. Y is the parameter estimated (the capacity demand). So, the regression model discovers the weight (m, n, o, p) for each variable by using the machine learning and measured capacity demand as training input, as acquired from the database 502, for example. When the regression model is built on the basis of the training, e.g. when the weights have been discovered, the regression model can be stored for later use in the same AOI (with a different set of social media data) or in different AOI for a different set of social media data (different values of X1, X2, X3, X4 . . . ).

Figure 8:
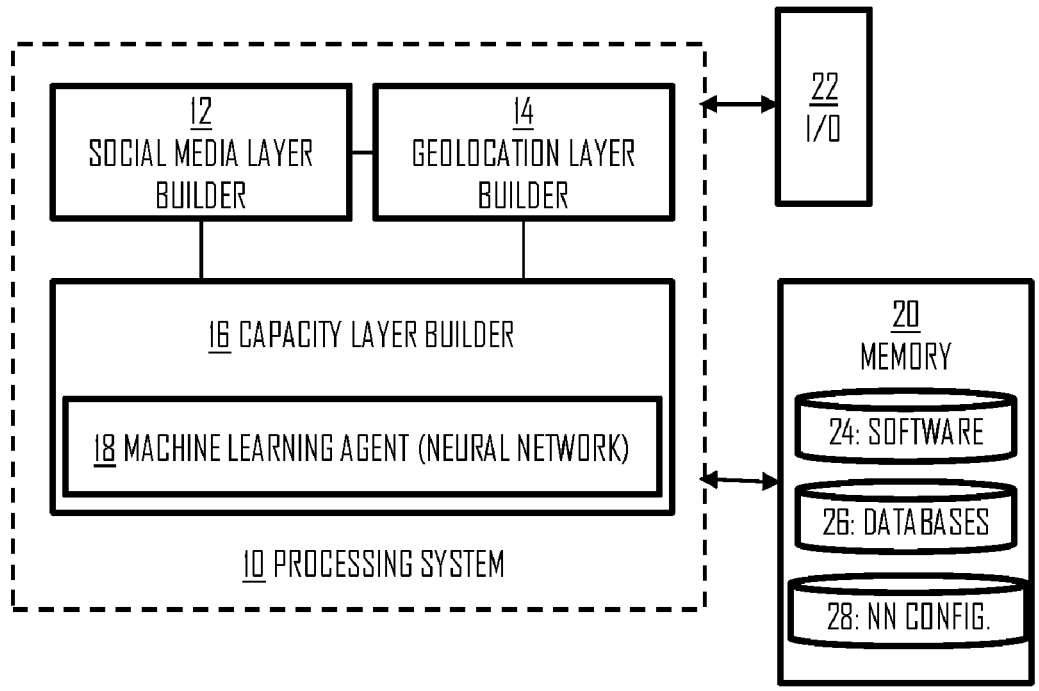
FIG. 8 illustrates a block diagram of a structure of an apparatus according to an embodiment of the invention.

FIG. 8 illustrates an embodiment of a structure of the above-mentioned functionalities of an apparatus or a system for executing the process of FIG. 2 or any one of embodiments thereof. In an embodiment, the apparatus comprises at least one processor, at least one memory and computer program code configured to, with the at least one processor, cause the apparatus to execute the process of FIG. 2 or any one of embodiments thereof.

Referring to FIG. 8, the apparatus may comprise a processing system 10 comprising the at least one processor. The processing system may comprise one or more processors of a single physical computer system, or it may comprise distributed computation resources at various physical computer. The processing system may employ cloud computing and/or local processing resources.

The apparatus may comprise a communication interface 22 configured to provide the apparatus with capability of communicating over one or more computer networks. For example, the above-described databases (26 in FIG. 8) may be provided in remote memory resources accessible by using the communication interface. The communication interface may be a network adapter supporting one or more networking protocols such as Internet protocol (IP), transport control protocol (TCP), etc.

The apparatus may further comprise a memory 20 storing one or more computer program products 24 configuring the operation of said processor(s) of the apparatus. The memory 20 may be implemented using any suitable data storage technology, such as semiconductor-based memory devices, flash memory, magnetic memory devices and systems, optical memory devices and systems, fixed memory and removable memory. The memory 20 may further store a t least some of the above-described databases 26. The memory 20 may further store a configuration database 28 storing configuration for a machine learning agent 18 configured to build the capacity layer according to embodiments described above. The configuration database 28 may, for example, store the configuration of the neural network (NN).

The processing system 10 may comprise, as sub-modules, a social media layer builder 12, a geolocation layer builder 14, and a capacity layer builder 16. Each of the modules 12 to 16 may be defined by a separate computer program code module. The social media layer builder 12 may be configured to execute block 200 according to any one of the above-described embodiments. In some embodiments, the builder 12 carries out block 310. The geolocation layer builder 14 may be configured to carry out block 202 and, in some embodiments, block 320. The capacity layer builder 16 may be configured to carry out block 204 and, in some embodiments block 330. The capacity layer builder may employ a machine learning agent 18 in building the capacity layer. The machine learning agent 18 may realize a neural network, for example. In such a case, the machine learning agent may be configured to implement the procedure of FIG. 5, in particular blocks 510 and 512.

As used in this application, the term 'circuitry' refers to one or more of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention. The processes or methods described in FIGS. 2, 3 and 5 or any of the embodiments thereof may also be carried out in the form of one or more computer processes defined by one or more computer programs. A separate computer program may be provided in one or more apparatuses that execute functions of the processes described in connection with the Figures. The computer program(s) may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

Embodiments described herein are applicable to computer systems defined above but also to other systems. It will be obvious to a person skilled in the art that, as technology advances, the inventive concept can be implemented in various ways. Embodiments are not limited to the examples described above but may vary within the scope of the claims.

The invention claimed is:
1. An apparatus comprising:
   at least one processor; and
   at least one memory including computer program code,
      wherein the at least one memory and computer program code configured to, with the at least one processor, cause the apparatus to perform the following:

forming, by using one or more social media applications, a social media layer storing records of a plurality of places in an area of interest;

forming, by using at least one source storing real geolocations of the places, a geolocation layer mapping the places to the real geolocations;

classifying the places into a plurality of classes and assigning to each place a weight indicative of a traffic capacity demand dependent on a class of said place;

building a capacity layer for the area of interest on the basis of the real geolocations of the places provided by the geolocation layer and the traffic capacity demand per place indicated by the weights, the capacity layer indicating spatial distribution of network traffic capacity demand in a plurality of sub-areas of the area of interest, the plurality of sub-areas comprising sub-areas having at least one of the places and sub-areas between the places.

2. The apparatus of claim 1, wherein the at least one memory and computer program code are configured to, with the at least one processor, cause the apparatus to output the capacity layer for network planning of a cellular network infrastructure.

3. The apparatus of claim 1, wherein the at least one memory and computer program code are configured to, with the at least one processor, cause the apparatus to combine, to the same record in the social media layer, social media data representing the same place, the social media data acquired from at least a first data source and a second data source, wherein social media data acquired from the first data source is considered to represent the same place as social media data acquired from the second data source, if both social media data indicate a location of the place within a certain distance from one another and/or if both social media data indicate the same place by a name with similarity above a determined threshold.

4. The apparatus of claim 1, wherein the at least one memory and computer program code are configured to, with the at least one processor, cause the apparatus to build the capacity layer without measurement data indicating an amount of network traffic.

5. The apparatus of claim 1, wherein the at least one memory and computer program code are configured to, with the at least one processor, cause the apparatus to project the network traffic capacity demand for a sub-area between at least two of the places on the basis of the weights of the at least two of the places.

6. The apparatus of claim 1, wherein the at least one memory and computer program code are configured to, with the at least one processor, cause the apparatus to use the following information as training input for building the capacity layer: a social media layer storing records of other places in another area of interest and, for each of said other places, a one of the plurality of classes to indicate the traffic capacity demand of respective place; and a measured traffic capacity demand at said another area of interest.

7. The apparatus of claim 6, wherein the area of interest represents a first city and said another area of interest represents a second city different from the first city but determined to have social media activity that correlates with social media activity of the first city.

8. The apparatus of claim 1, wherein the at least one memory and computer program code are configured to, with the at least one processor, cause the apparatus to build the capacity layer by at least performing the following:

dividing the area of interest into the plurality of sub-areas by using the geolocation layer;

computing a traffic capacity demand for each of the plurality of sub-areas by using said weight or weights of a place or places in said sub-area and, further, by using said weight or weights of a place or places in sub-areas that are neighbors to said each of the plurality of sub-areas.

9. The apparatus of claim 1, wherein the at least one memory and computer program code are configured to, with the at least one processor, cause the apparatus to assign the weight further on the basis of a demographic type of the sub-area of the respective place.

10. The apparatus of claim 9, wherein a weight associated with a higher traffic capacity demand is assigned to a determined class in a sub-area having an urban demographic type than to the determined class in a sub-area having a sub-urban or rural demographic type, while a weight associated with a lower traffic capacity demand is assigned to another determined class in a sub-area having an urban demographic type than to said another determined class in a sub-area having a sub-urban or rural demographic type.

11. The apparatus of claim 1, wherein the at least one memory and computer program code are configured to, with the at least one processor, cause the apparatus to acquire information on at least one of building types and building sizes in the area of interest and to use the information on the at least one of building types and building sizes as a further input when building the capacity layer.

12. The apparatus of claim 1, wherein the at least one memory and computer program code are configured to, with the at least one processor, cause the apparatus to store, in the social media layer, addresses of the plurality of places as acquired from the one or more social media applications, to map the addresses to geographical coordinates in the geolocation layer, and to map the plurality of places to the sub-areas by using the geographical coordinates.

13. A computer-implemented method for estimating network traffic capacity demand in an area-of-interest, comprising:

forming, by using one or more social media applications, a social media layer storing records of a plurality of places in the area of interest;

forming, by using at least one source storing real geolocations of the places, a geolocation layer mapping the places to geolocations;

classifying the places into a plurality of classes and assigning to each place a weight indicative of a traffic capacity demand dependent on a class of said place;

building a capacity layer for the area of interest on the basis of the real geolocations of the places provided by the geolocation layer and the traffic capacity demand per place indicated by the weights, the capacity layer indicating spatial distribution of network traffic capacity demand in a plurality of sub-areas of the area of interest, the plurality of sub-areas comprising sub-areas having at least one of the places and sub-areas between the places.

14. The computer-implemented method of claim 13, further comprising using the capacity layer in network planning of a cellular network infrastructure and selecting locations of cells of the cellular network infrastructure.

15. The computer-implemented method of claim 13, further comprising combining, to the same record in the social media layer, social media data representing the same place, the social media data acquired from at least a first data source and a second data source, wherein social media data acquired from the first data source represents the same place as social media data acquired from the second data source, if both social media data indicate a location of the place within a certain distance from one another and/or if both social media data indicate the same place by a name with similarity above a determined threshold.

16. The computer-implemented method of claim 13, wherein the capacity layer is built without measurement data indicating an amount of network traffic.

17. The computer-implemented method of claim 13, wherein the network traffic capacity demand is projected for a sub-area between at least two of the places on the basis of the weights of the at least two of the places.

18. The computer-implemented method of claim 13, wherein the following information is used as training input for building the capacity layer: a social media layer storing records of other places in another area of interest and, for each of said other places, a one of the plurality of classes to indicate the traffic capacity demand of respective place; and a measured traffic capacity demand at said another area of interest.

19. The computer-implemented method of claim 18, wherein the area of interest represents a first city and said another area of interest represents a second city different from the first city but determined to have social media activity that correlates with social media activity of the first city.

20. The computer-implemented method of claim 13, wherein the capacity layer is built by at least performing the following:
dividing the area of interest into the plurality of sub-areas by using the geolocation layer;
computing a traffic capacity demand for each of the plurality of sub-areas by using said weight or weights of a place or places in said sub-area and, further, by using said weight or weights of a place or places in sub-areas that are neighbors to said each of the plurality of sub-areas.

21. The computer-implemented method of claim 13, wherein the weight is assigned further on the basis of a demographic type of the sub-area of the respective place.

22. The computer-implemented method of claim 21, wherein a weight associated with a higher traffic capacity demand is assigned to a determined class in a sub-area having an urban demographic type than to the determined class in a sub-area having a sub-urban or rural demographic type, while a weight associated with a lower traffic capacity demand is assigned to another determined class in a sub-area having an urban demographic type than to said another determined class in a sub-area having a sub-urban or rural demographic type.

23. The computer-implemented method of claim 13, wherein information on at least one of building types and building sizes in the area of interest is acquired and used as a further input when building the capacity layer.

24. The computer-implemented method of claim 13, further comprising storing, in the social media layer, addresses of the plurality of places as acquired from the one or more social media applications, mapping the addresses to geographical coordinates in the geolocation layer, and mapping the plurality of places to the sub-areas by using the geographical coordinates.

25. A non-transitory computer-readable medium comprising a computer program code readable by a computer for an apparatus of a first wireless network, wherein the computer program code configures the computer to carry out a computer process for estimating network traffic capacity demand in an area-of-interest, comprising:
forming, by using one or more social media applications, a social media layer storing records of a plurality of places in the area of interest;
forming, by using at least one source storing real geolocations of the places, a geolocation layer mapping the places to geolocations;
classifying the places into a plurality of classes and assigning to each place a weight indicative of a traffic capacity demand dependent on a class of said place;
building a capacity layer for the area of interest on the basis of the real geolocations of the places provided by the geolocation layer and the traffic capacity demand per place indicated by the weights, the capacity layer indicating spatial distribution of network traffic capacity demand in a plurality of sub-areas of the area of interest, the plurality of sub-areas comprising sub-areas having at least one of the places and sub-areas between the places.

* * * * *